United States Patent
Kasama et al.

(10) Patent No.: US 7,308,692 B2
(45) Date of Patent: Dec. 11, 2007

(54) FEED ROLLER, OPTICAL DISK CARRYING UNIT AND OPTICAL DISK RECORDING/PLAYBACK DEVICE

(75) Inventors: Hiroshi Kasama, Tokyo (JP); Youhide Kido, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 462 days.

(21) Appl. No.: 10/995,582

(22) Filed: Nov. 23, 2004

(65) Prior Publication Data

US 2005/0114873 A1    May 26, 2005

(30) Foreign Application Priority Data

Nov. 26, 2003 (JP) ............................ P2003-395449

(51) Int. Cl.
*G11B 17/04* (2006.01)

(52) U.S. Cl. ........................ 720/625; 720/624

(58) Field of Classification Search ................ 720/624, 720/625
See application file for complete search history.

(56) References Cited

U.S. PATENT DOCUMENTS 4,507,768 A * 3/1985 Ikedo et al. ................. 720/624
5,719,844 A * 2/1998 Abe .......................... 720/625

FOREIGN PATENT DOCUMENTS

| JP | 2000082248 A | * | 3/2000 |
| JP | 2002230877 A | * | 8/2002 |
| JP | 2003059150 A | * | 2/2003 |
| JP | 2003059151 A | * | 2/2003 |
| JP | 2003123358 A | * | 4/2003 |
| JP | 2003151192 A | * | 5/2003 |
| JP | 2004118936 A | * | 4/2004 |

\* cited by examiner

*Primary Examiner*—William J Klimowicz
(74) *Attorney, Agent, or Firm*—RatnerPrestia

(57) ABSTRACT

A problem that carriage of a disk by a feed roller cannot be smoothly accomplished depending on a type of the disk is to be solved. To achieve the object, the feed roller has an overall shape of expanding in diameter, and has floating roller parts movably fitted to a roller shaft in a central part and fixed roller parts pressed in and fixed in its two sides. A rotational force transmitted from a disk carrying motor causes a downward force to work on the feed roller through a roller gear. Even when a pressing force on the disk weakens, the fixed roller parts on the two sides can serve to carry the disk smoothly.

3 Claims, 7 Drawing Sheets

Fig. 3
(Prior Art)
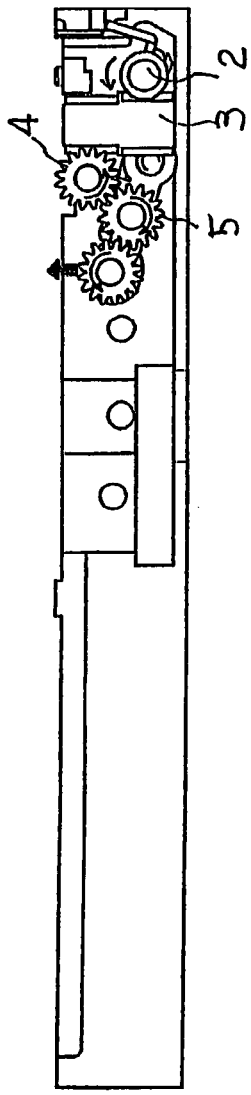
(a)
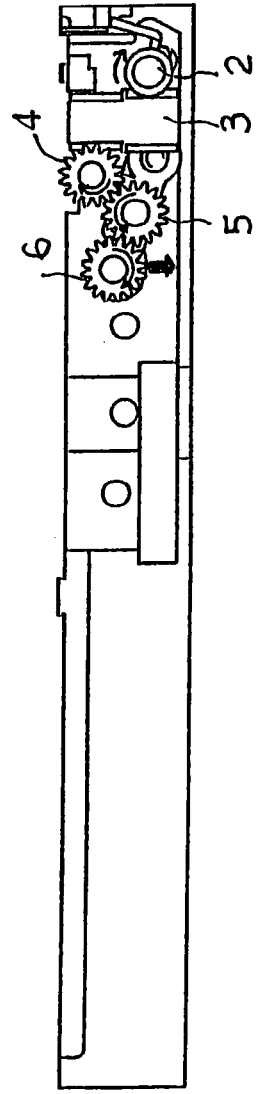
(b)

Fig. 4
(a)
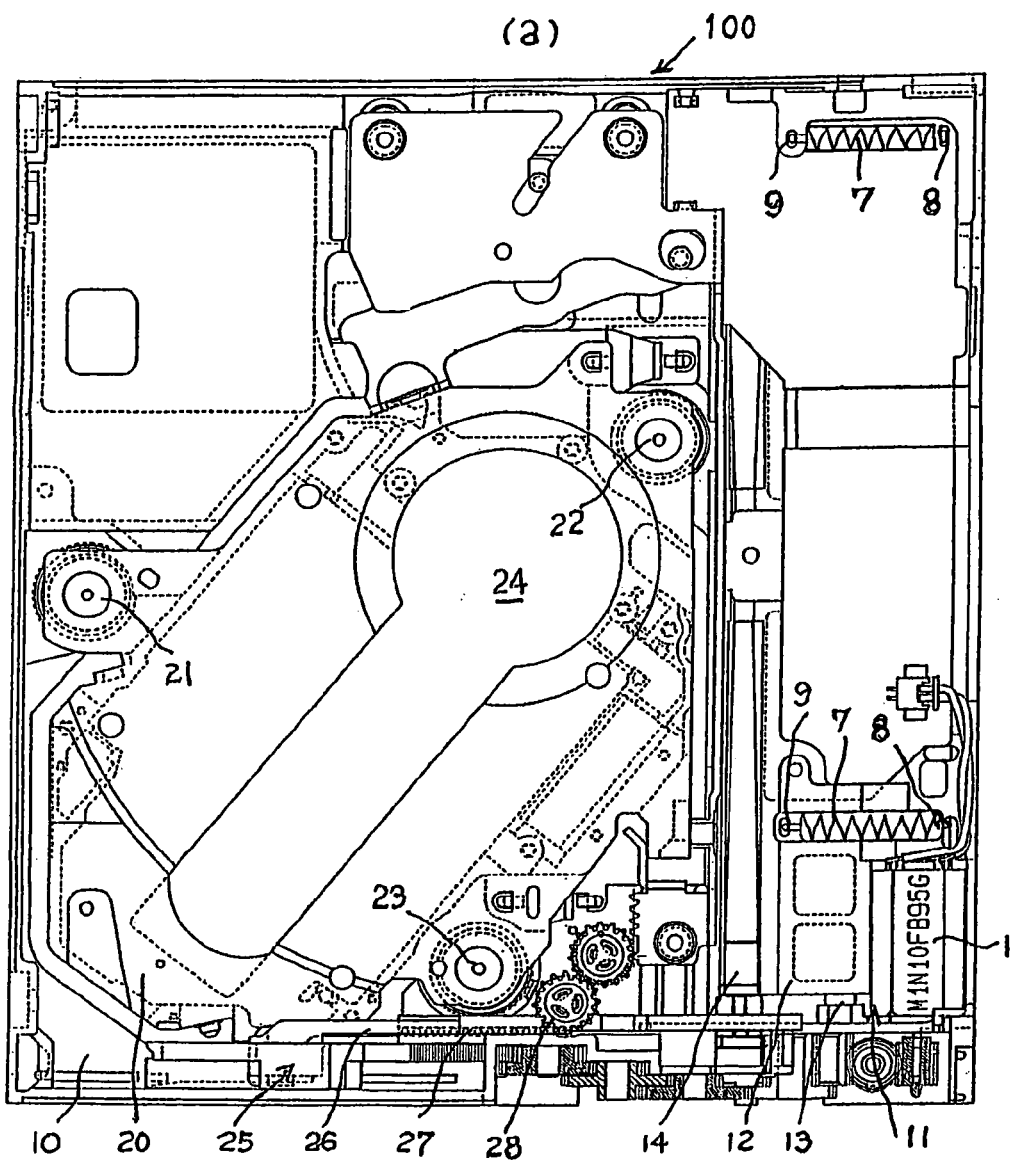
(b)
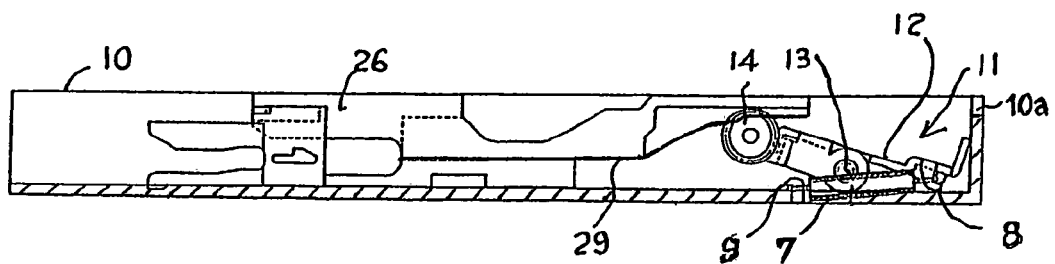

Fig. 5
(a)
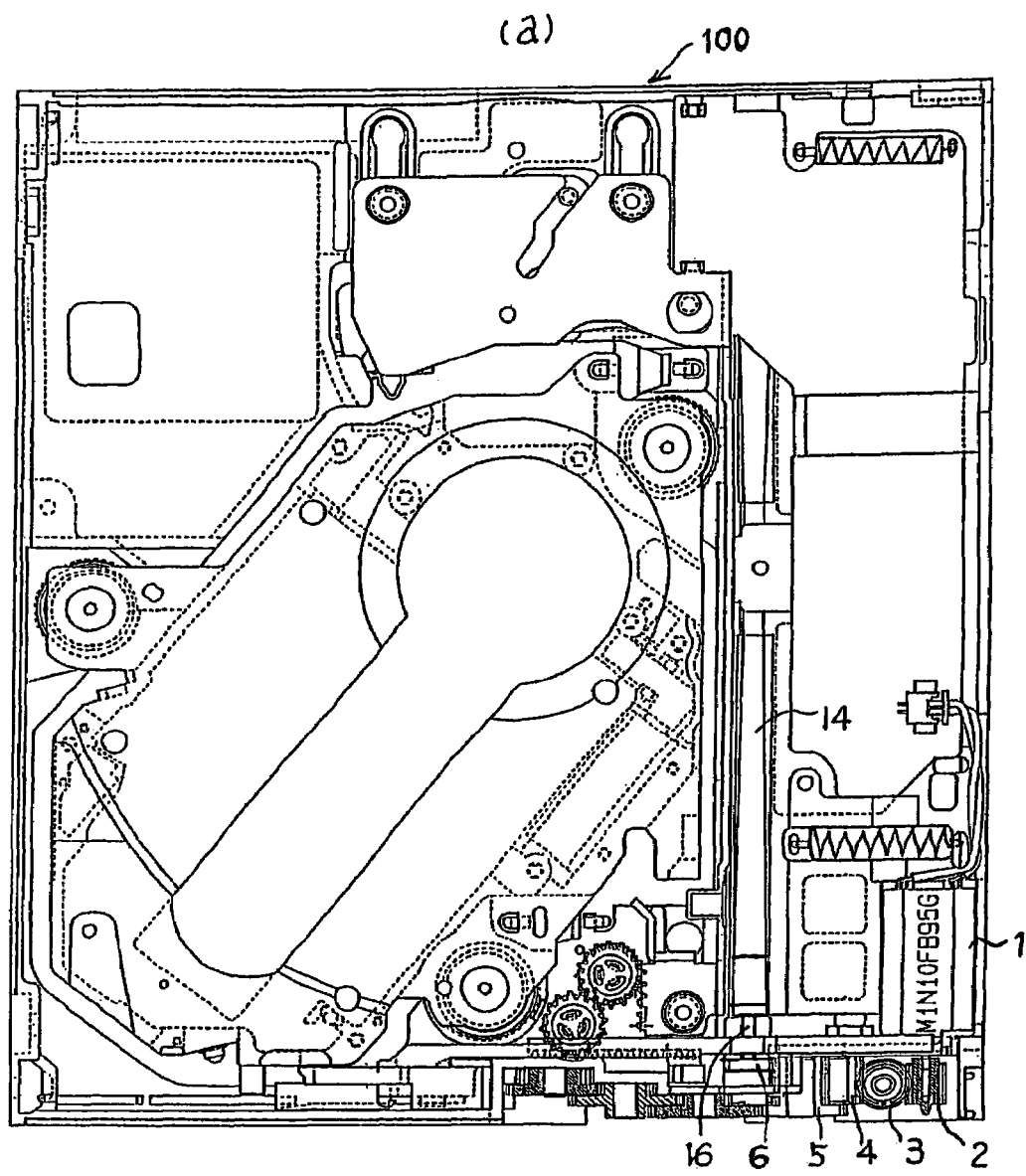
(b)
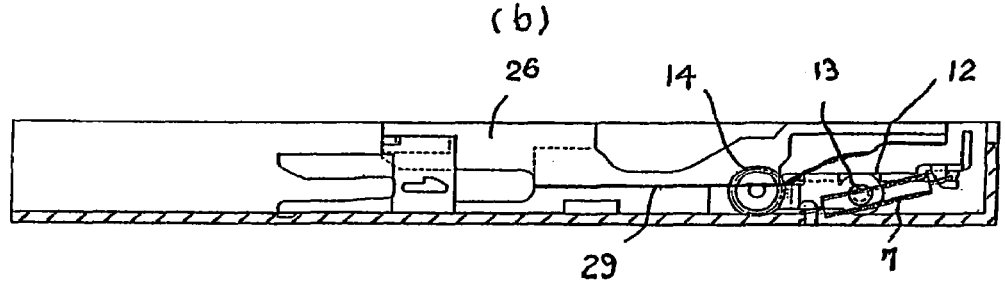

FEED ROLLER, OPTICAL DISK CARRYING UNIT AND OPTICAL DISK RECORDING/PLAYBACK DEVICE

BACKGROUND OF THE INVENTION

1. Field of the Invention

The present invention relates to a feed roller for feeding a disk, an optical disk carrying unit equipped with this feed roller, and an optical disk recording/playback device equipped with this optical disk carrying unit.

2. Description of the Prior Art

The market for optical disk recording/playback devices, especially vehicle-counted optical disk recording/playback devices, has been demanding their reduction in size and thickness, and technological development attempts are being extensively made to meet this demand. In order to reduce the size and thickness of optical disk recording/playback devices, commonly adopted means is to directly hold an optical disk between a feed roller and a disk guide and carry it instead of mounting the optical disk on a tray when inserting it into or ejecting it out of a recording/playback device (see, for instance, the Japanese Published Unexamined Patent Application No. Hei 8-138298).

FIG. 1 illustrate the configuration of a disk carrying unit for a conventional vehicle-mounted optical disk recording/playback device, FIG. 1A showing a front sectional view, FIG. 1B showing a plan and FIG. 1C showing a side sectional view. Referring to FIG. 1, a disk carrying unit 11 is arranged in the front part of a lower chassis 10, which is the main chassis of the device. The disk carrying unit 11 is provided with a sheet metal-made feed plate 12 extending in the widthwise direction of the lower chassis 10, and rotational spindles 13 protruding from the centers of both sides of the feed plate 12 rotatably pivot on the lower chassis 10. At the rear ends of both sides of the feed plate 12, a rubber-made feed roller 14 gradually expanded in diameter from the center towards both ends is rotatably disposed. The feed roller 14 is movably fitted to a roller shaft 16, and slips relative to the roller shaft 16. Incidentally, as the roller shaft 16 is thin and long, a sleeve is press-fitted into its central part as reinforcement, and this sleeve is supported by the feed plate 12 (see FIG. 2). The feed plate 12 is rotationally forced in the clockwise direction in FIG. 1C by torsional coil springs 15 disposed around the rotational spindles 13. In its normal state, the feed plate 12 approaches a disk guide 31 formed integrally with the upper chassis 30, and a disk D inserted through a disk inlet 10a is held between the feed roller 14 and the disk guide 31. The disk inlet 10a is formed in the front board of the lower chassis 10.

The disk guide 31 has a first protruding strip 31a and a second protruding strip 31b arranged on the two sides of the feed roller 14 and parallel to each other, and a third protruding strip 31c formed in a part close to the disk inlet 10a and shaped like a dogleg by inclining the central and end parts in mutually reverse directions. Each of these protruding strips 31a, 31b and 31c protrudes toward the feed roller 14 to form a crest and tapered at the same slope from both ends toward the center so as to approach the feed roller 14. The presence of these tapered protruding strips enables the disk D, inserted through the disk inlet 10a, to be carried toward the inner part of the device by the feed roller 14 while being centered by the protruding strips 31c, 31b and 31a and, at the end of carriage, to be aligned to the central position of a turntable, which is intended to turn the disk D.

FIG. 2 shows a lower chassis assembly in the conventional optical disk recording/playback device. A worm gear 2 is fixed to a disk carrying motor 1, a first gear 3 meshes with the worm gear 2, a second gear 4 meshes with the first gear 3, a third gear 5 meshes with the second gear 4, and a roller gear 6 meshes with the third gear 5. The first through third gears 3 to 5 are supported by the lower chassis 10 while the roller gear 6 is fixed to the roller shaft 16 of the feed roller 14 and comes into contact with or moves away from the third gear 5 with the oscillation of the feed plate 12.

However, the conventional disk carrying unit described above involves the problem that the carriage of a disk by the feed roller 14 may not be smooth at the time of ejection depending on the type of the disk. This problem will be explained with reference to FIG. 3. At the time of inserting a disk illustrated in FIG. 3A, the worm gear 2 is turned counterclockwise, the first gear 3 clockwise, the second gear 4 counterclockwise, the third gear 5 clockwise and the roller gear 6 counterclockwise, all by the disk carrying motor 1. The feed roller 14 presses the disk on it against the disk guide 31 to carry it toward the inner part of the device. On the other hand, when ejecting the disk as illustrated in FIG. 3B, the worm gear 2 is turned clockwise, the first gear 3 counterclockwise, the second gear 4 clockwise, the third gear 5 counterclockwise and the roller gear 6 clockwise, all by the disk carrying motor 1. The feed roller 14 presses the disk on it against the disk guide 31 to carry it outward in the device. As the third gear 5 then turns counterclockwise to press the roller gear 6 downward, a downward force works on the feed roller 14 to slightly weaken the pressing force on the disk. As a result, the feed roller 14 slips relative to the roller shaft 16 depending on any warp of the disk or the coefficient of friction of the disk among other factors, leading to obstruction of smooth carriage of the disk. On the other hand when inserting the disk as illustrated in FIG. 3A, the third gear 5 turns clockwise to press the roller gear 6 upward, the pressing force on the disk is secured, resulting in smooth carriage of the disk.

The slip of the feed roller 14 relative to the roller shaft 16 is a structurally required factor, because, when the carriage of the disk by the feed roller 14 ends, the motor is still turning though the shifting of the disk is ended by a stopper, too heavy a load will be imposed on the motor unless the feed roller 14 is structured to be slidable. In addition, when the disk is ejected, the user taking out the disk after the nearer half of the disk has been ejected outside the device may force it out and damage the disk or otherwise adversely affect the operability unless the feed roller 14 is structured to be slidable.

SUMMARY OF THE INVENTION

An object of the present invention, attempted to solve the above-described problem with the prior art, is to provide a feed roller capable of smoothly carrying a disk, an optical disk carrying unit and an optical disk recording/playback device equipped therewith.

In order to achieve the object stated above, a feed roller according to the invention for carrying a disk held between a disk guide and the feed roller has a configuration in which a central part of the feed roller is movably fitted to a roller shaft and ends of the same are fixed to the roller shaft by tight fit or transition fit.

This configuration causes, when the disk is to be ejected, a downward force to work on the feed roller through a roller gear. Even when the pressing force on the disk weakens and the central part of the fixed roller slips relative to the roller gear, the roller parts on the two sides do not slip and therefore can serve to carry the disk smoothly.

BRIEF DESCRIPTION OF THE DRAWINGS

FIG. 3A is a schematic profile showing the operation of the feed roller drive system according to the prior art when inserting a disk;

FIG. 3B is a schematic profile showing the operation of the feed roller drive system according to the prior art when ejecting a disk;

FIG. 4A illustrates a lower chassis and suspension chassis assembly in an optical disk recording/playback device, which is a preferred embodiment of the present invention, presenting a schematic plan of a state in which a feed roller is being driven;

FIG. 4B shows a schematic profile of FIG. 4A;

FIG. 5A shows a schematic plan of the feed roller in the embodiment of the invention when in a retracted state;

FIG. 5B shows a schematic profile of FIG. 5A;

DESCRIPTION OF THE PREFERRED EMBODIMENT

Figure 1:
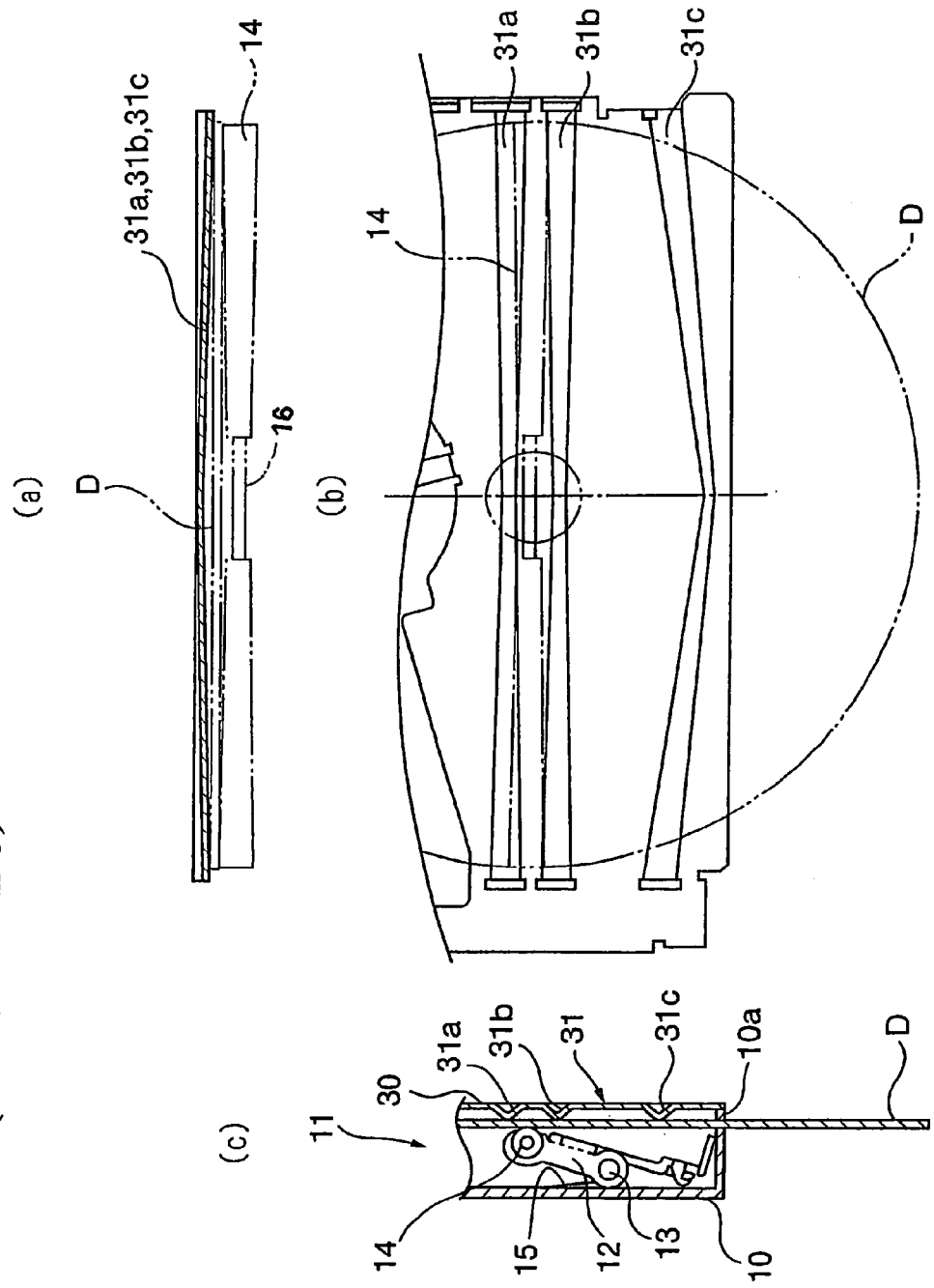
FIG. 1A shows a schematic front sectional view of the disk carrying unit according to the prior art.
FIG. 1B shows a schematic plan of the disk carrying unit according to the prior art.
FIG. 1C shows a schematic side sectional view of the disk carrying unit according to the prior art.
Figure 2:
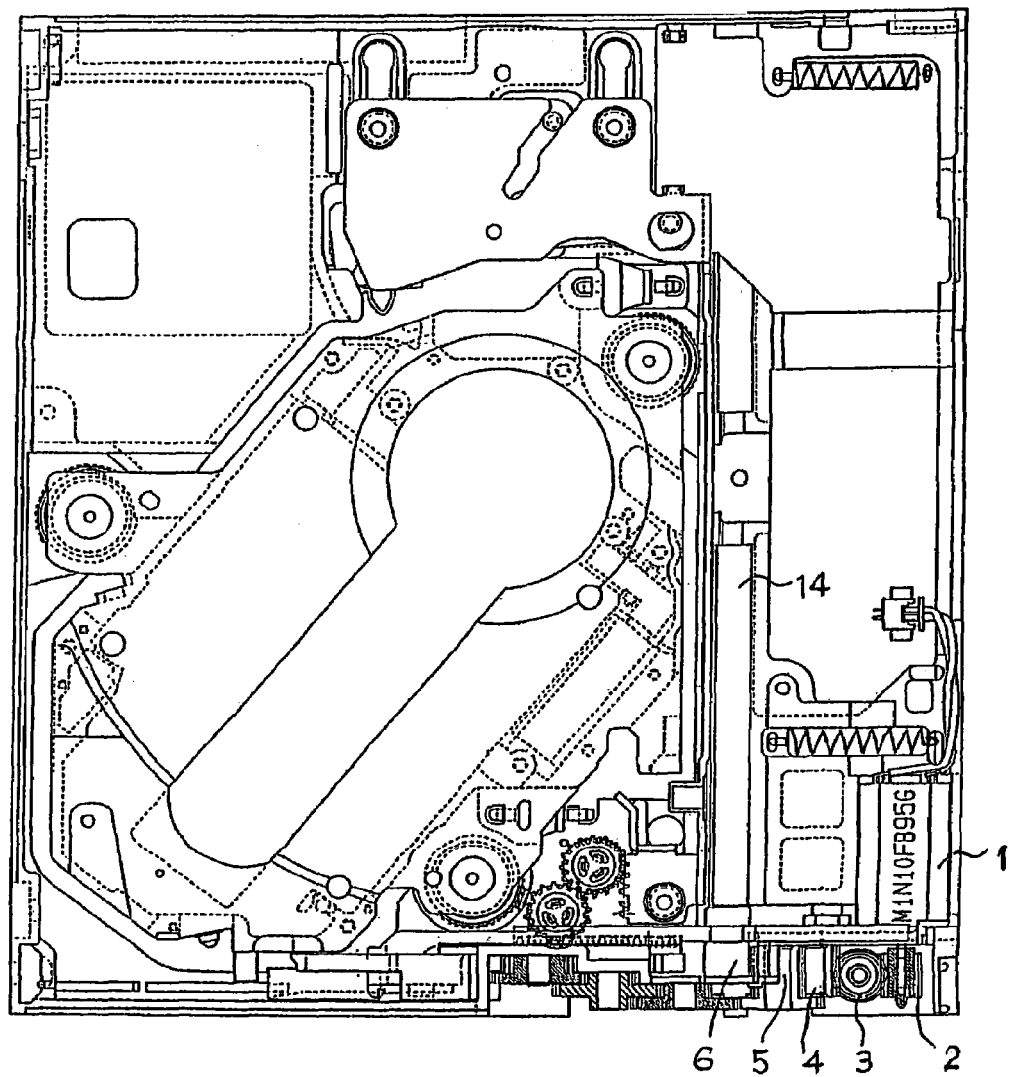
FIG. 2 shows a schematic plan of the lower chassis assembly of the optical disk recording/playback device according to the prior art.

A preferred embodiment of the present invention will be described below with reference to accompanying drawings. FIG. 4A is a schematic plan of a lower chassis and suspension chassis assembly of a vehicle-mounted optical disk recording/playback device 100, which is the embodiment of the invention; FIG. 4B is a schematic profile of that lower chassis assembly; FIG. 5A is a schematic plan of a state in which the feed roller is in a position away from the disk; and FIG. 5B is its schematic profile. For the convenience of description, signs used for description of the prior art with reference to FIG. 1 and FIG. 2 are used for denoting respectively similar members.

Referring to FIG. 4 and FIG. 5, a disk carrying unit 11 is arranged in the front part of a lower chassis 10 within an optical disk recording/playback device 100. The disk carrying unit 11 is provided with a sheet metal-made feed plate 12, and rotational spindles 13 protruding from the centers of both sides of the feed plate 12 rotatably pivot on the lower chassis 10. At the rear ends of both sides of the feed plate 12, a rubber-made feed roller 14 gradually expanded in diameter from the center towards both ends is rotatably disposed. Details of the feed roller 14 will be described afterwards. The feed plate 12 is rotationally forced by two tensile coil springs 7 disposed on the right and left so as to raise the feed roller 14 side. Of each of the tensile coil springs 7, one end is supported by an engaging piece 8 disposed on the rear side of the front end of the feed plate and the other end is supported by another engaging piece 9 disposed on the bottom face of the lower chassis 10 so that the direction of its load passes the vicinity of the underside of the rotational spindles 13 of the feed plate 12.

A suspension chassis 20 is supported at three points by damper mechanisms 21, 22 and 23, each made up of an oil damper and a coil spring, over the lower chassis 10. A turntable mechanism and an optical pickup mechanism are fitted to the opening 24 of the suspension chassis 20, and the clamp arm of a disk clamp mechanism for pressing the disk against the turntable is rotatably fitted via a suspension lock mechanism 25 disposed on the inside face of one of them.

Figure 6:
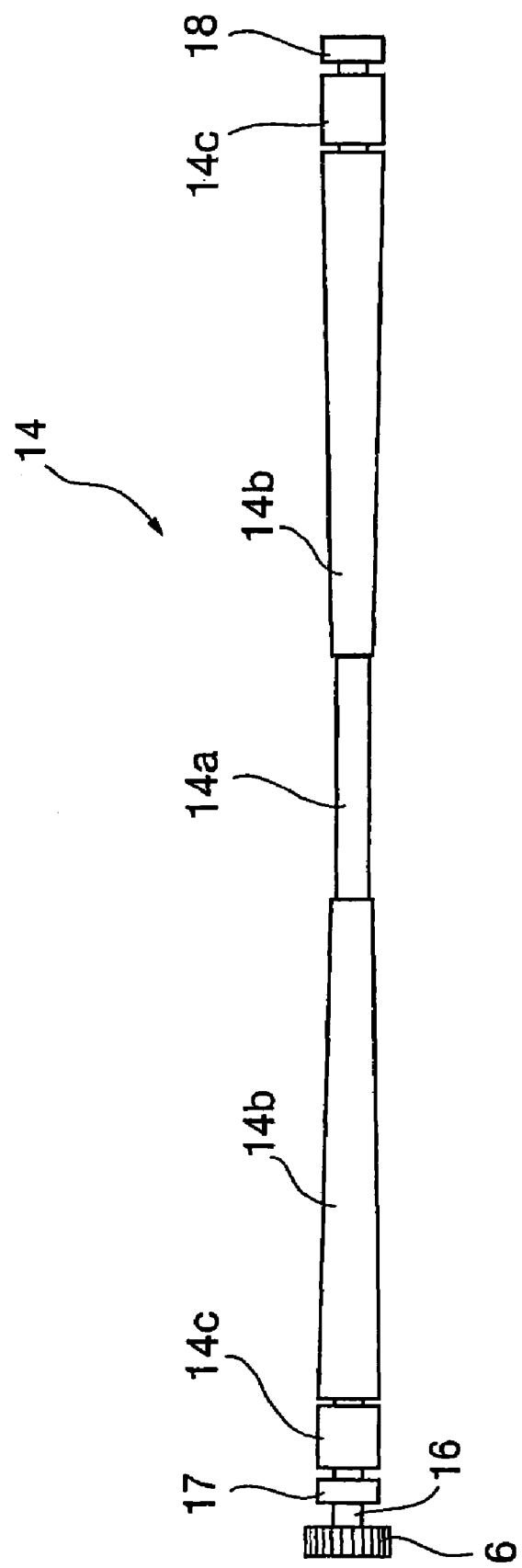
FIG. 6 shows a front view of the feed roller in the embodiment of the invention.

FIG. 6 shows the feed roller in the embodiment of the invention. The feed roller 14 comprises a fluoroethylene tetrafluoride-made sleeve 14a press-inserted and fixed in the central part of the roller shaft 16 in the lengthwise direction, floating roller parts 14b movably fitted into its two sides, and fixed roller parts 14c pressed in and fixed in its two sides. As the roller shaft 16 is made of metal and the feed roller 14 is made of rubber, the fixed roller parts 14c could be fixed to the roller shaft 16 by transition fit, but tight fit is used in this embodiment. On each side of the fixed roller parts 14c, a fluoroethylene tetrafluoride-made washer is inserted to reduce friction against adjacent members. The dimensions of the floating roller parts 14b and the fixed roller parts 14c may vary with the position of the feed roller 14, the distance of carriage and other factors, and in this embodiment, they are so set that, when proceeding from the end of disk insertion to the next clamping action, the periphery of the disk goes off the fixed roller parts 14c and is supported by an end of the adjoining floating roller part 14b (see FIG. 7C). Roller bearings 17 and 18 supported by the feed plate 12 are fixed to the outsides of the right and left fixed roller parts 14c, and the sleeve 14a at the center is fixed to a claw-shaped engaging part formed on the feed plate 12.

Next will be described the operation of the optical disk recording/playback device embodying the invention in this mode. Referring to FIG. 4, as the user inserts a disk into the optical disk recording/playback device 100 through its disk inlet 10a, the disk carrying motor 1 starts rotating in response to a signal from a photosensor having detected the insertion of the disk, the feed roller 14 rotates, and the disk is drawn into the device while being centered by three tapered protruding strips 31a, 31b and 31c, formed on the feed roller 14 and an upper chassis 30 to serve as disk guides. When the disk is drawn into the device, the rear end of the disk actuates the suspension lock mechanism 25; a suspension lock member 26 disposed one flank of the suspension chassis 20 slides forward; the meshing of its rack 27 with a pinion 28 causes the pinion 28, driven by the disk carrying motor 1, to drive forward the rack 27; a cam face 29 formed on the under face of its forward end presses the feed roller 14 down; and the feed plate 12 rotates counter-clockwise around the rotational spindles 13. This causes the feed roller 14 to move away from the upper chassis 30 and, as shown in FIG. 5, that state is held by the bottom of the cam face 29 to hold the suspension chassis 20 in a floating state. At the same time, the clamp arm descends to cause the disk clamp to position the disk on the turntable, and the optical pickup mechanism plays back the disk.

When the playback of the disk ends and an eject button is pressed, reverse turn of the disk carrying motor 1 causes an operation in a sequence reverse to the foregoing to take place. First, the clamp arm ascends to cause the disk clamp to move away from the disk; the pinion 28 causes the rack 27 and the suspension lock member 26 to slide backward;

the feed plate 12 is moved upward by the cam face 29 to bring the feed roller 14 into contact with the disk; and the disk is ejected out of the device. Then, since one end of each of the tensile coil springs 7 which rotationally force the feed plate 12 is supported by the engaging piece 8 disposed on the front end of the feed plate 12 and the other end is supported by the engaging piece 9 disposed on the bottom face of the lower chassis 10 so that the direction of its load passes the vicinity of the underside of the rotational spindles 13 of the feed plate 12, the feed plate 12 can be turned with less force when it is to be turned in the direction of moving away from the disk guides, making it possible to use a disk carrying motor 1 of a smaller power output.

Figure 7:
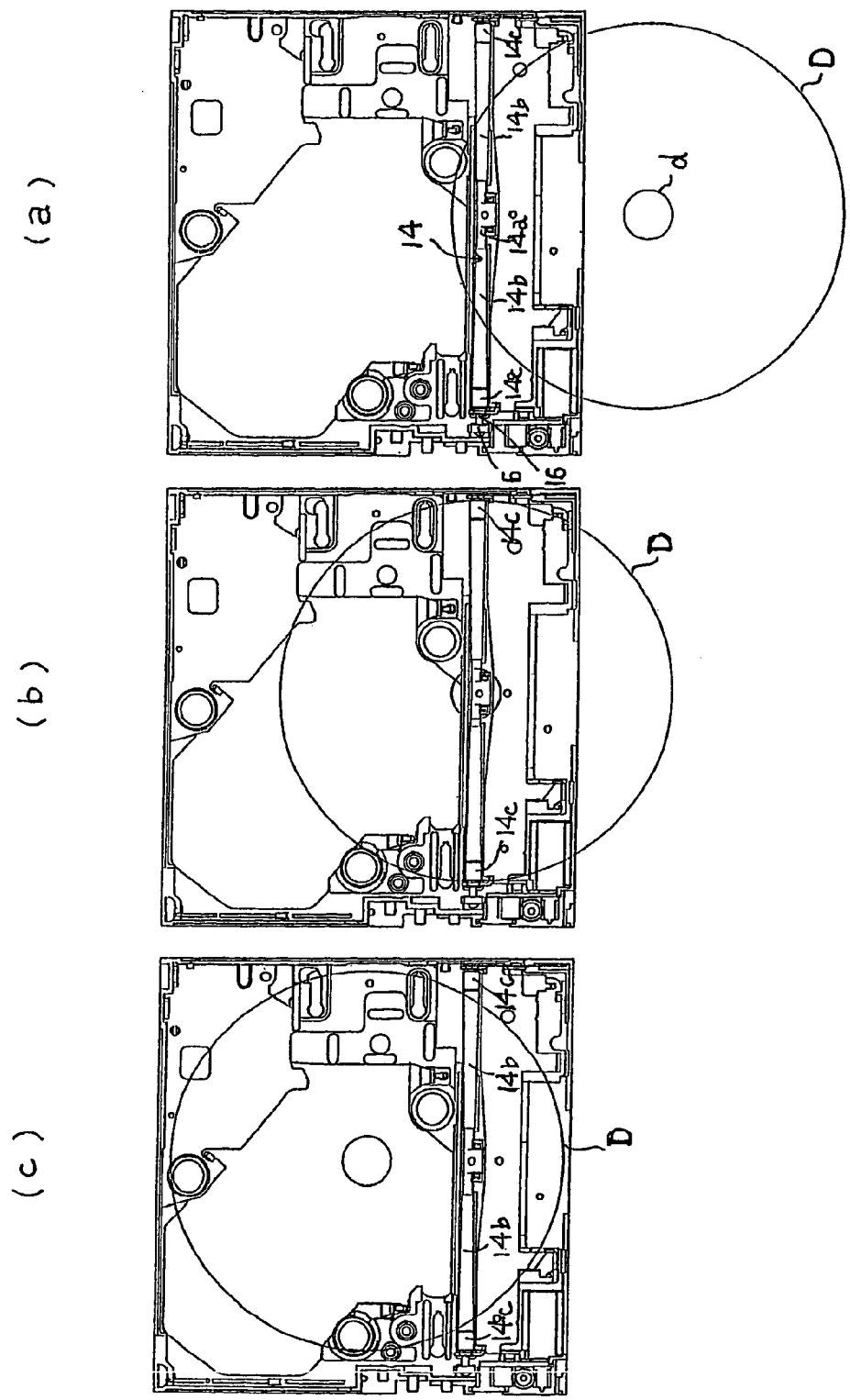
FIG. 7A shows a schematic plan of the feed roller in the embodiment of the invention when in the early phase of disk insertion and in the late phase of disk ejection.
FIG. 7B shows a schematic plan of the feed roller in the embodiment of the invention when on the way of disk insertion and on the way of disk ejection.
FIG. 7C shows a schematic plan of the feed roller in the embodiment of the invention when ending disk insertion and when starting disk ejection.

Next will be described the action of the feed roller 14 in this embodiment with reference to FIG. 7. FIG. 7A shows states in the early phase of the insertion and in the late phase of the ejection of the disk D by the feed roller 14. As the load on the disk D is small in the early phase of disk insertion, the disk D can be smoothly carried by the floating roller parts 14b of the feed roller 14. At the time of end of disk ejection, the user can put his or her finger into a center hole d of the disk D and easily take the disk D out of the device. FIG. 7B shows states on the way of the insertion and on the way of the ejection of the disk D by the feed roller 14. The periphery of the disk D is positioned on the fixed roller parts 14c, which can securely carry the disk. FIG. 7C shows states at the time ending the insertion and starting the ejection of the disk D by the feed roller 14. The disk D is supported by the floating roller parts 14b, which slip while turning so as not to impose a load on the disk carrying motor 1.

Incidentally, while the feed roller 14 in this embodiment is supposed to have, with a disk diameter of 12 cm being assumed, floating roller parts 14b of about 43.5 mm and fixed roller parts 14c of about 5.5 mm, both in length, the suitable dimensions of these parts may differ with the position of the feed roller 14 within the optical disk recording/playback device 100. Depending on how deep (or shallow) in the inserting direction of the disk D the feed roller 14 is arranged, the optimal lengths of the floating roller parts 14b and of the fixed roller parts 14c may vary. Thus, when the disk D is in a position shown in FIG. 7A or 7C or a position close to it, especially where the disk D is to be drawn out or clamped, it is preferable for the arrangement of the feed roller 14 to be so determined that only the floating roller parts 14b come in contact with the disk D and, in any other position near what is shown in FIG. 7B, the fixed roller parts 14c and the disk D never fail to come into contact with each other.

In this way, in the disk carrying unit of this embodiment, the feed roller 14 is formed in an overall shape gradually expanding in diameter and has the floating roller parts 14b movably fitted to the roller shaft 16 in the central part and the fixed roller parts 14c pressed in and fixed in its two sides, the rotational force transmitted from the disk carrying motor 1 causes a downward force to work on the feed roller 14 through the roller gear 6. Even when the pressing force on the disk weakens, the fixed roller parts 14c on the two sides can serve to carry the disk smoothly.

Further, by configuring the optical disk recording/playback device 100 by use of such a disk carrying unit, a thin but high-performance optical disk recording/playback device can be realized.

Incidentally, in the embodiment described above, a straight portion without a slope can be disposed in a prescribed range in the central part of the second protruding strip 31b arranged on the disk inlet side of the disk guide 31, and prescribed ranges on both sides of can be formed in steeply inclined tapered portions. In such a configuration, when the disk is drawn out for ejection, only the periphery of the rear end of the disk comes into point contact with the steeply inclined tapered portions, making it possible to prevent the disk from being damaged by its line contact with the protruding strip.

As hitherto described, the feed roller according to the invention can achieve at the same time a slide structure in the central part of the feed roller and securing of a carrying capability by its two sides, resulting in the capability of smoothly carrying the disk. It can be effectively used in an optical disk carrying unit for carrying an optical disk held between the unit and a rotatable feed roller, and an optical disk recording/playback device equipped with such a unit.

The feed roller according to the invention enables the disk to be only in point contact with the elements of the device, and makes it possible to minimize the risk of damage to the disk.

The disk carrying unit according to the invention makes it possible to realize a thin but high-performance optical disk carrying unit capable of smoothly carrying the optical disk.

An optical disk recording/playback device according to the invention makes it possible to realize a thin but high-performance optical disk recording/playback device capable of smoothly carrying the optical disk.

Since the feed roller according to the invention can achieve at the same time a slide structure in the central part of the feed roller and securing carrying capability by its two sides, resulting in the capability of smoothly carrying the disk, it provides an advantage of making possible realization of a thin but high-performance optical disk recording/playback device.

Although the invention has been described to a preferred embodiment thereof illustrated in accompanying drawings, obviously persons skilled in the art can readily modify or alter the embodiment without deviating from the true spirit and scope of the invention, and the invention also covers such modifications or alterations.

What is claimed is:

1. An optical disk carrying unit comprising:
   a rotatable feed roller;
   a disk guide arranged substantially opposite said feed roller, and carries an optical disk held between said feed roller and said disk guide;
   said feed roller including:
     floating roller parts movably fitted to a roller shaft at a central part of said feed roller; and
     fixed roller parts fixedly fitted to said roller shaft at both end parts of said feed roller;
     wherein said disk comes into contact with said floating roller parts without contacting said fixed roller parts when said disk is in a position where the disk is to be clamped; and
     said fixed roller parts and the disk come into contact with each other when the disk is in a position other than when the disk is to be clamped.

2. The optical disk carrying unit according to claim 1, wherein said feed roller expands in diameter from a central part toward both sides.

3. An optical disk recording/playback device provided with said optical disk carrying unit according to claim 2.

* * * * *